US009452682B2

(12) United States Patent
Triantos et al.

(10) Patent No.: US 9,452,682 B2
(45) Date of Patent: Sep. 27, 2016

(54) TRANSMISSION FOR A VEHICLE

(71) Applicant: GM GLOBAL TECHNOLOGY OPERATIONS LLC, Detroit, MI (US)

(72) Inventors: Konstantinos Triantos, Huntington Beach, CA (US); John A. Diemer, Farmington Hills, MI (US); Pete R. Garcia, Troy, MI (US); Kent A. Miller, Pinckney, MI (US); Anthony P. Tata, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 332 days.

(21) Appl. No.: 13/744,990

(22) Filed: Jan. 18, 2013

(65) Prior Publication Data
US 2014/0202402 A1 Jul. 24, 2014

(51) Int. Cl.
| | |
|---|---|
| *B60L 11/14* | (2006.01) |
| *B60K 6/405* | (2007.10) |
| *F16H 57/04* | (2010.01) |
| *B60L 3/00* | (2006.01) |
| *B60L 15/00* | (2006.01) |
| *B60L 11/12* | (2006.01) |

(52) U.S. Cl.
CPC .............. *B60L 11/14* (2013.01); *B60K 6/405* (2013.01); *B60L 3/003* (2013.01); *B60L 11/123* (2013.01); *B60L 15/007* (2013.01); *F16H 57/0424* (2013.01); *B60L 2210/40* (2013.01); *B60L 2240/36* (2013.01); *F16H 57/0476* (2013.01); *Y02T 10/6217* (2013.01); *Y02T 10/645* (2013.01); *Y02T 10/7077* (2013.01); *Y02T 10/7241* (2013.01); *Y02T 90/16* (2013.01)

(58) Field of Classification Search
CPC ......... B60K 6/405; B60K 6/40; F16H 57/04; F16H 57/0423; F16H 57/0424; F16H 57/0453
See application file for complete search history.

(56) References Cited

U.S. PATENT DOCUMENTS

| | | | | |
|---|---|---|---|---|
| 5,585,681 | A * | 12/1996 | Bitsche ........................... | 310/54 |
| 6,166,498 | A | 12/2000 | Yamaguchi et al. | |
| 6,166,937 | A * | 12/2000 | Yamamura et al. .......... | 363/141 |
| 6,201,365 | B1 * | 3/2001 | Hara et al. ..................... | 318/558 |
| 6,688,383 | B1 * | 2/2004 | Sommer et al. .............. | 165/200 |
| 6,822,353 | B2 * | 11/2004 | Koga et al. ..................... | 310/64 |
| 7,102,260 | B2 * | 9/2006 | Takenaka et al. .............. | 310/64 |
| 7,847,450 | B2 * | 12/2010 | Kakuda et al. ................. | 310/89 |
| 7,855,887 | B2 * | 12/2010 | Kakuda et al. ............... | 361/699 |
| 2004/0124722 | A1 * | 7/2004 | Uchida et al. .................. | 310/54 |
| 2005/0167183 | A1 * | 8/2005 | Tominaga et al. ............ | 180/444 |
| 2005/0244691 | A1 * | 11/2005 | Varenne .......................... | 429/26 |
| 2005/0253465 | A1 * | 11/2005 | Takenaka et al. .............. | 310/52 |
| 2006/0064998 | A1 * | 3/2006 | Funahashi et al. .......... | 62/259.2 |

(Continued)

*Primary Examiner* — Daniel Yabut
(74) *Attorney, Agent, or Firm* — Quinn Law Group, PLLC

(57) ABSTRACT

A transmission for a vehicle is disclosed. The transmission includes a casing defining a first cavity and a second cavity inside the casing, with the first cavity selectively open to outside of the casing. The transmission also includes a platform at least partially disposed inside the casing to separate the first and second cavities. Furthermore, the transmission includes a power inverter module selectively disposed in the first cavity. The power inverter module includes a cooling system for cooling the power inverter module. The transmission also includes a guide attached to the platform and the casing within the second cavity such that the guide provides fluid communication between the cooling system of the power inverter module within the first cavity and outside of the casing while bypassing the second cavity.

20 Claims, 7 Drawing Sheets

(56) References Cited

U.S. PATENT DOCUMENTS

| | | | |
|---|---|---|---|
| 2008/0169088 A1* | 7/2008 | Aoki et al. | 165/104.19 |
| 2009/0021971 A1* | 1/2009 | Korich et al. | 363/141 |
| 2010/0238629 A1* | 9/2010 | Shiba | 361/699 |
| 2011/0039649 A1* | 2/2011 | Tanae et al. | 180/65.21 |
| 2012/0170340 A1* | 7/2012 | Nakajima et al. | 363/131 |
| 2013/0294040 A1 | 11/2013 | Fukumasu et al. | |

\* cited by examiner

US 9,452,682 B2

TRANSMISSION FOR A VEHICLE

TECHNICAL FIELD

The present disclosure relates to a transmission for a vehicle.

BACKGROUND

Various transmissions have been developed for vehicles. One type of transmission is an electrically-variable transmission including two electric motor/generators, clutches, etc. Clutches allow one or more electrically-variable modes of operation, fixed speed ratio modes, and an electric-only (battery-powered) mode. An electric power inverter assembly is utilized to control the first and second electric motor/generators. Generally, the electric power inverter assembly is assembled remote from the electrically-variable transmission; therefore, assembly of the electric power inverter is labor intensive and additional brackets or supports are generally utilized to secure the electric power inverter assembly remote from the transmission. Furthermore, the power inverter assembly is cooled by routing fluid pipes thereto which are spaced from the transmission and thus additional space is required to accommodate these pipes.

SUMMARY

The present disclosure provides a transmission for a vehicle. The transmission includes a casing defining a first cavity and a second cavity inside the casing, with the first cavity selectively open to outside of the casing. The transmission also includes a platform at least partially disposed inside the casing to separate the first and second cavities. Furthermore, the transmission includes a power inverter module selectively disposed in the first cavity. The power inverter module includes a cooling system for cooling the power inverter module. The transmission also includes a guide attached to the platform and the casing within the second cavity such that the guide provides fluid communication between the cooling system of the power inverter module within the first cavity and outside of the casing while bypassing the second cavity.

The present disclosure also provides a transmission for a vehicle. The transmission includes a casing including an exterior outside of the casing. The casing defines a first cavity and a second cavity inside the casing, with the first cavity selectively open to the exterior of the casing. The transmission also includes a platform at least partially disposed inside the casing to separate the first and second cavities. Furthermore, the transmission includes a power inverter module including a bottom selectively coupled to the platform and a cover coupled to the bottom. The bottom and the cover cooperate to define a self-contained unit. The power inverter module is selectively disposed in the first cavity. The power inverter module includes a cooling system for cooling the power inverter module. The cooling system includes a body portion defining an inlet and an outlet. The body portion is coupled to the bottom of the power inverter module. The transmission further includes a guide attached to the platform and the casing within the second cavity such that the guide provides fluid communication between the inlet and the outlet of the cooling system of the power inverter module within the first cavity and outside of the casing while bypassing the second cavity.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
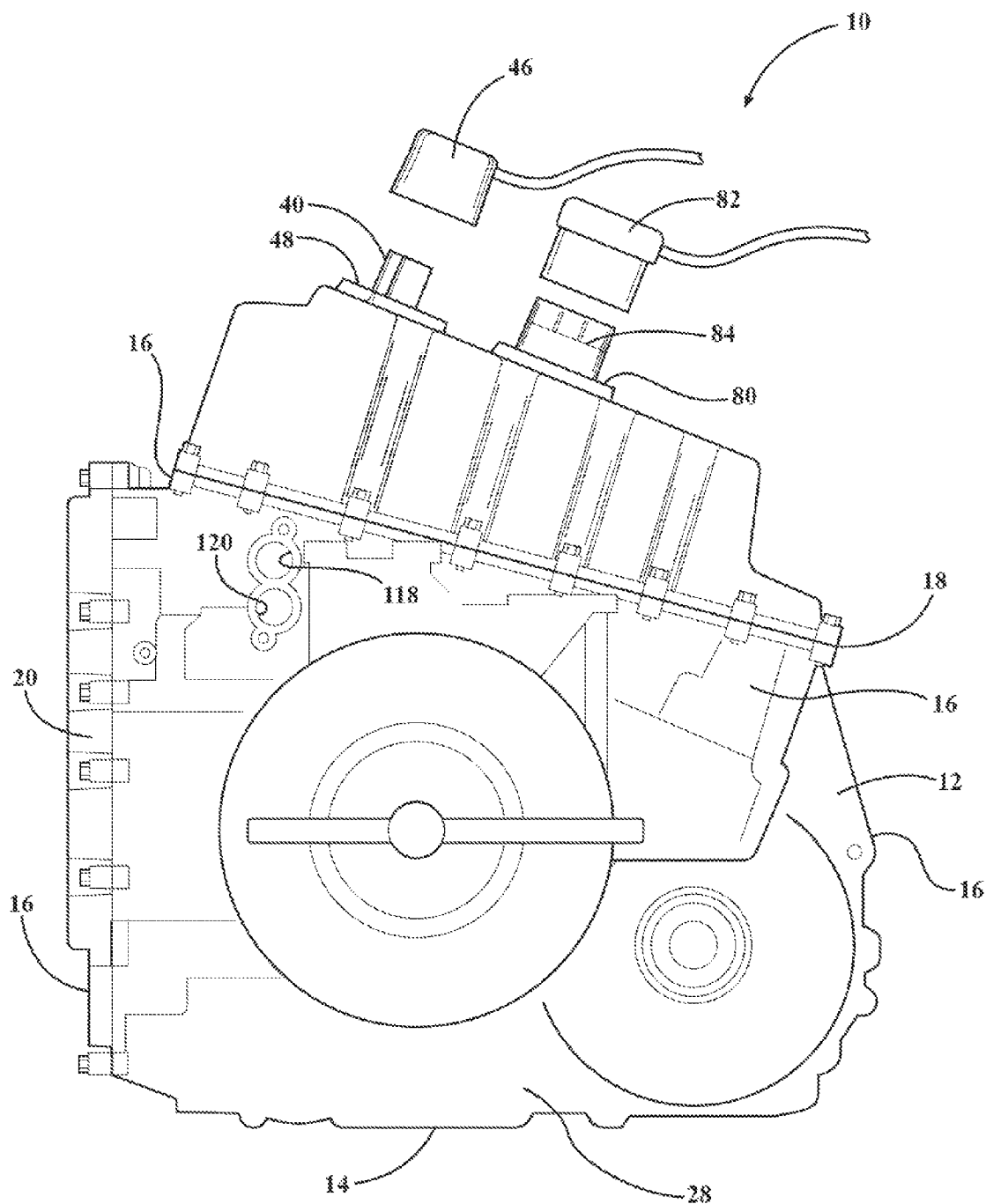
FIG. 1 is a schematic side view of a transmission with a first cable harness and a wire harness exploded from the transmission.

Referring to the Figures, wherein like numerals indicate like or corresponding parts throughout the several views, a transmission 10 for a vehicle is generally shown in FIG. 1. The transmission 10 can be an electrically-variable transmission 10 as discussed further below or any other suitable transmission 10. Therefore, the transmission 10 discussed herein can be for a hybrid vehicle or any other suitable vehicle.

Figure 2:
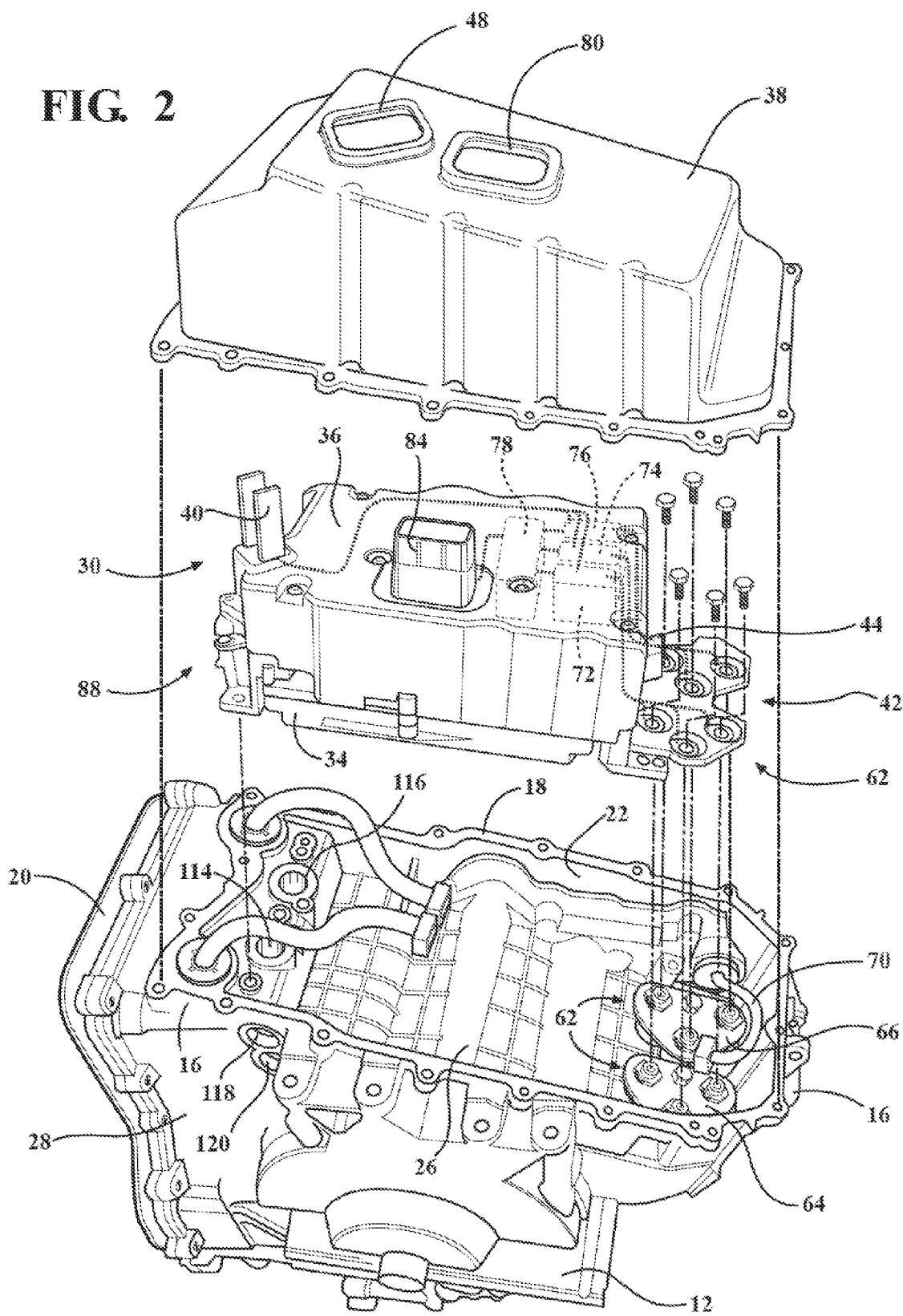
FIG. 2 is a schematic partially exploded perspective view of the transmission.

The transmission 10 includes a casing 12 as best shown in FIGS. 1 and 2. The casing 12 can include a base 14 and a plurality of walls 16 extending outwardly away from the base 14 to a distal edge 18. In certain embodiments, one or more walls 16 are integrally formed to the base 14. In other words, one or more walls 16 and the base 14 can be formed of one piece. Furthermore, in certain embodiments, a segment 20 of at least one of the walls 16 can be detachable from the other walls 16.

Figure 3:
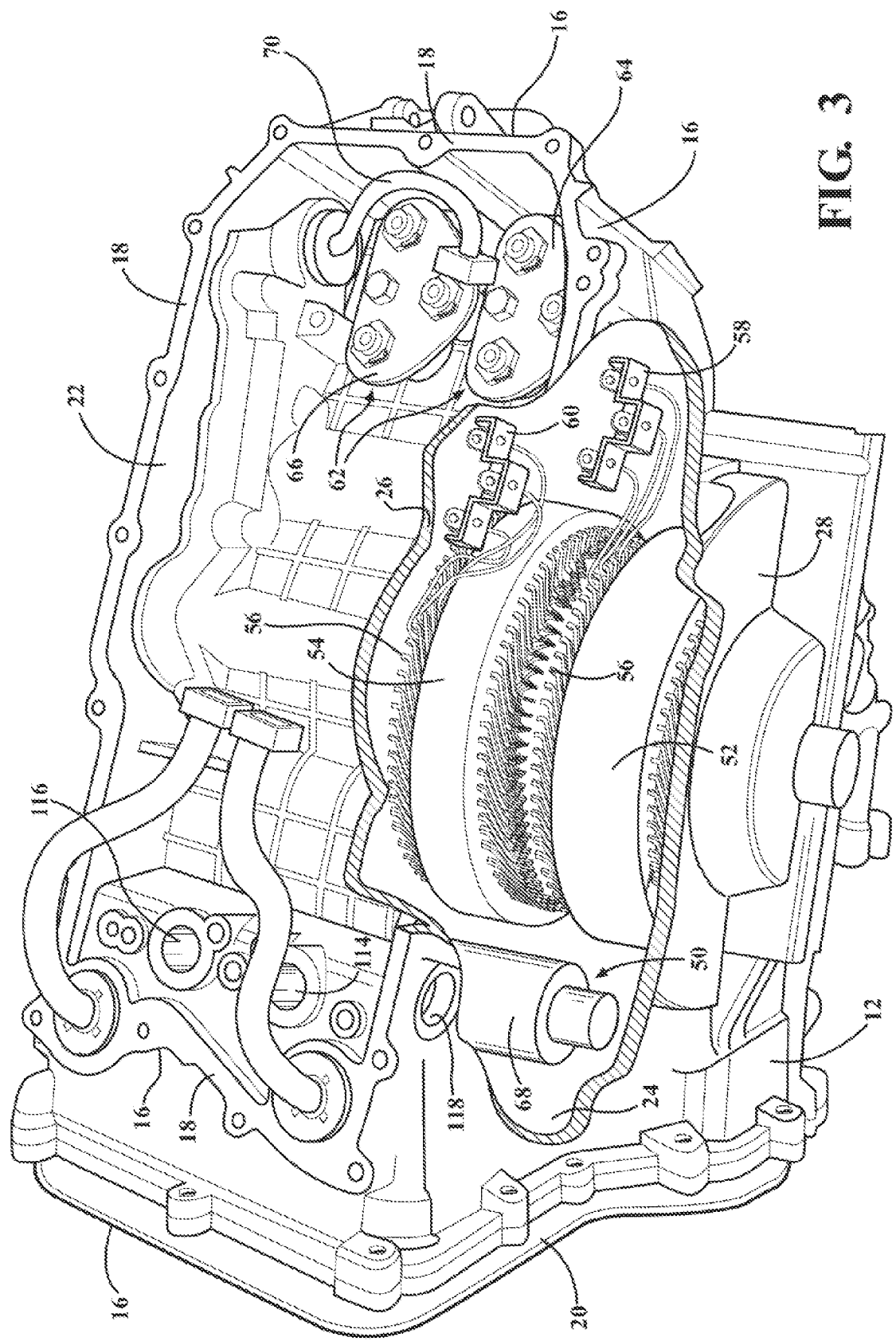
FIG. 3 is a schematic perspective broken view of a casing with a pump, a first motor/generator and a second motor/generator each disposed in a second cavity.
Figure 4:
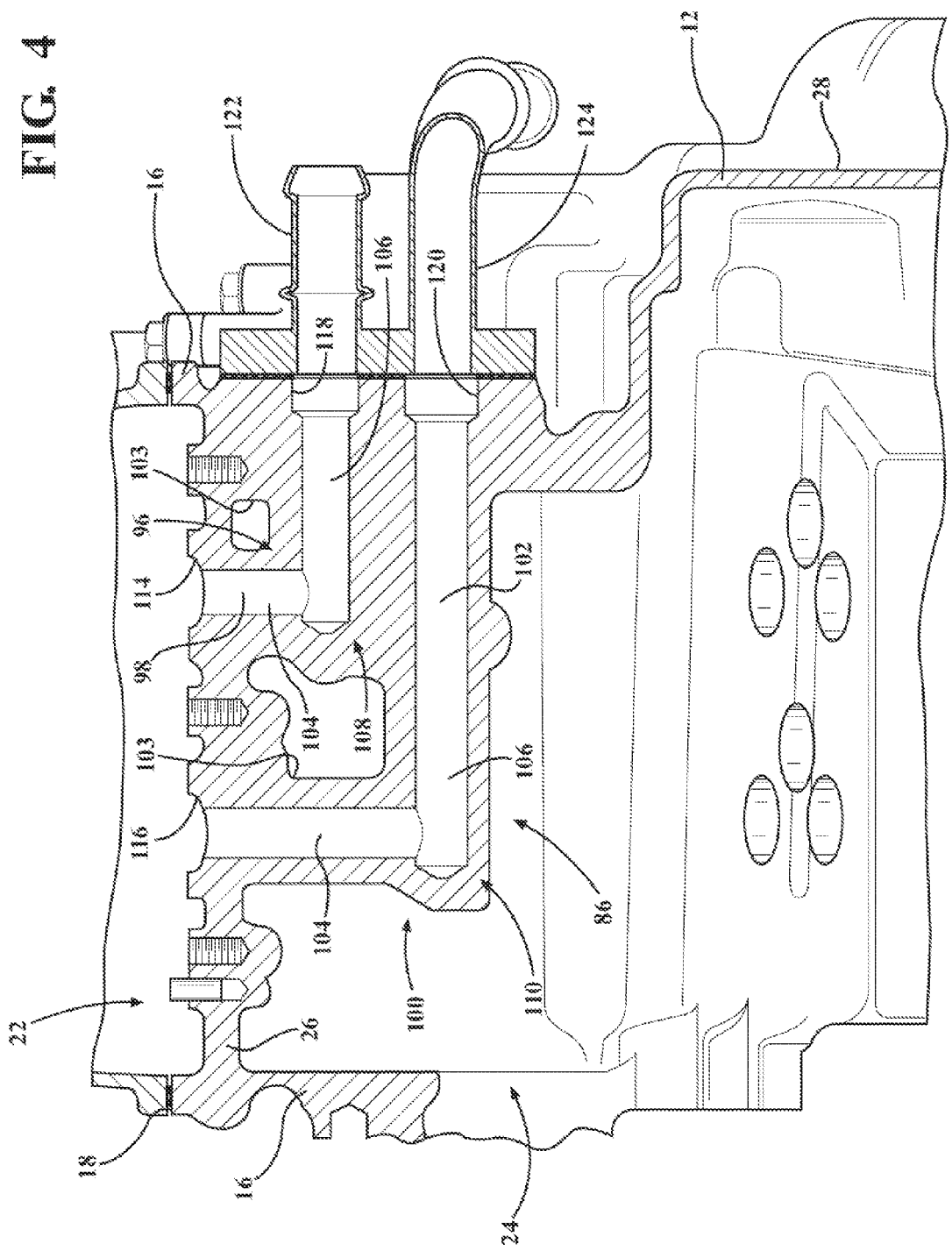
FIG. 4 is a schematic cross-sectional view of a lid, a portion of the casing, and a platform separating a first cavity and a second cavity.

Referring to FIGS. 2-4, the casing 12 defines a first cavity 22 and a second cavity 24 inside the casing 12, with the first cavity 22 selectively open to outside of the casing 12. More specifically, the casing 12 defines the first and second cavities 22, 24 between the walls 16. Generally, the first cavity 22 is disposed adjacent to the distal edge 18 of each of the walls 16. Furthermore, the first and second cavities 22, 24 are spaced from each other.

Continuing with FIGS. 2 and 3, in addition, the transmission 10 includes a platform 26 at least partially disposed inside the casing 12 to separate the first and second cavities 22, 24. Therefore, generally, at least a portion of the platform 26 is disposed inside the casing 12. Furthermore, the platform 26 is disposed between the walls 16 to separate the first and second cavities 22, 24. As such, in certain embodiments, the platform 26 and the first and second cavities 22, 24 are disposed between the walls 16.

The casing 12, and more specifically, the walls 16 can include an exterior 28 disposed outside of the casing 12. For example, the first cavity 22 is selectively open to outside of the casing 12, and more specifically, open to the exterior 28 of the casing 12. Specifically, the first cavity 22 is generally disposed adjacent to the distal edge 18 of each of the walls 16 such that the first cavity 22 is selectively open to the exterior 28 of the walls 16 and the second cavity 24 is substantially closed to the exterior 28 of the walls 16. Specifically, in certain embodiments, the first cavity 22 is disposed above the second cavity 24 such that the platform 26 and the walls 16 cooperate to substantially close the second cavity 24.

The first cavity 22 is configured for receiving a gaseous fluid to define a dry interior. In certain embodiments, the gaseous fluid in the first cavity 22 is air. It is to be appreciated that other gaseous fluids can be disposed in the first cavity 22.

Furthermore, the second cavity 24 is configured for receiving a liquid fluid to define a wet interior. In certain embodiments, the liquid fluid in the second cavity 24 is transmission fluid. Therefore, in certain embodiments, the second cavity 24 is configured for receiving transmission fluid to define the wet interior. For example, the transmission fluid can be automatic transmission fluid (ATF). It is to be appreciated that other liquid fluids can be disposed in the second cavity 24.

The first cavity 22 is generally disposed above the second cavity 24 for maintaining the liquid fluid in the second cavity 24 such that the first cavity 22 defines the dry interior. In other words, the first cavity 22 is generally disposed above the second cavity 24 for maintaining the transmission fluid in the second cavity 24. More specifically, the first cavity 22 is generally disposed above the second cavity 24 for maintaining the transmission fluid in the second cavity 24 such that the first cavity 22 defines the dry interior. Furthermore, the platform 26 separates the first and second cavities 22, 24 to assist in maintaining the liquid fluid in the second cavity 24.

Referring to FIGS. 2 and 4, the transmission 10 further includes a power inverter module 30 selectively disposed in the first cavity 22. It is to be appreciated that the power inverter module 30 can also be referred to as a traction power inverter module (TPIM).

Figure 6:
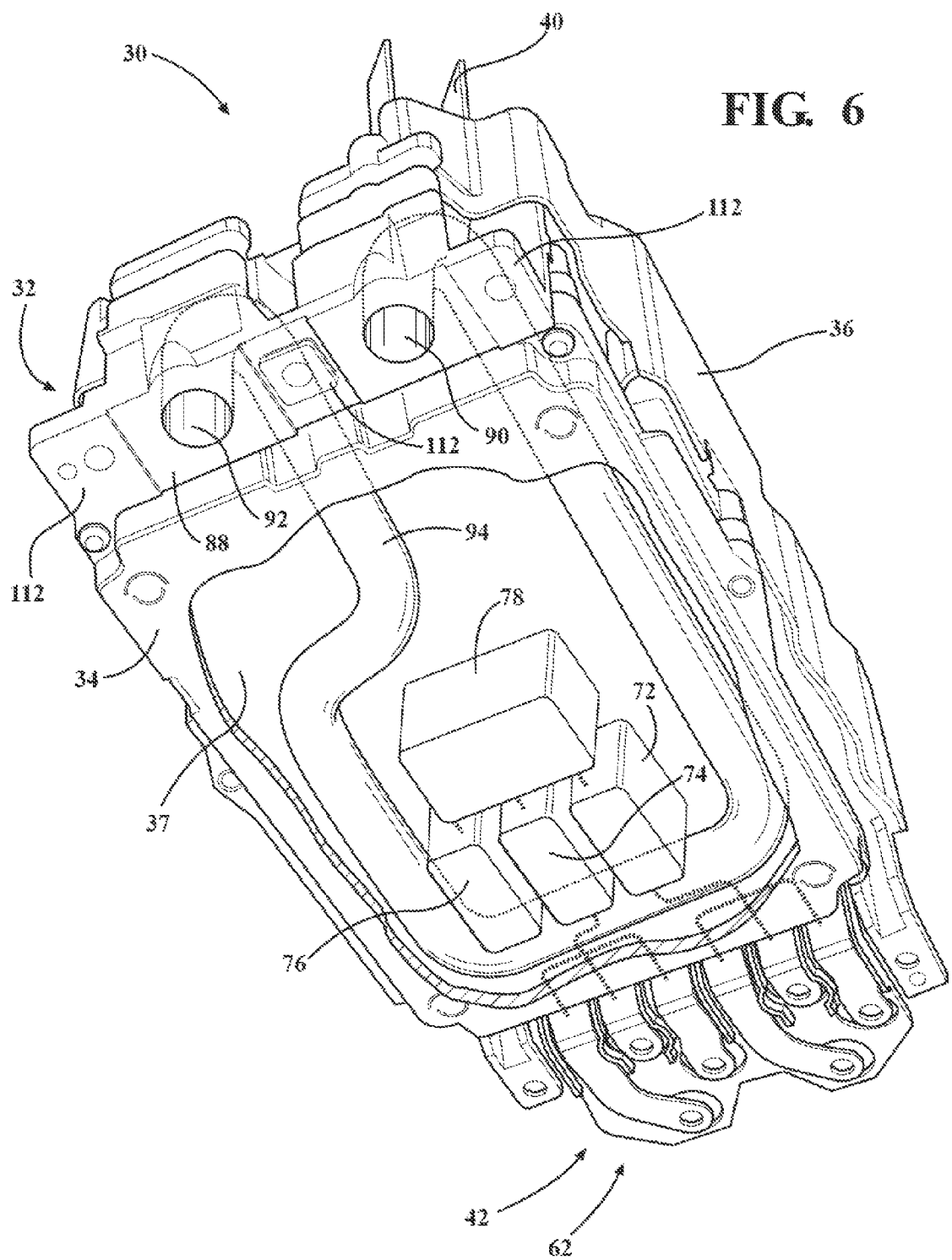
FIG. 6 is a schematic bottom perspective broken view of the power inverter module.
Figure 7:
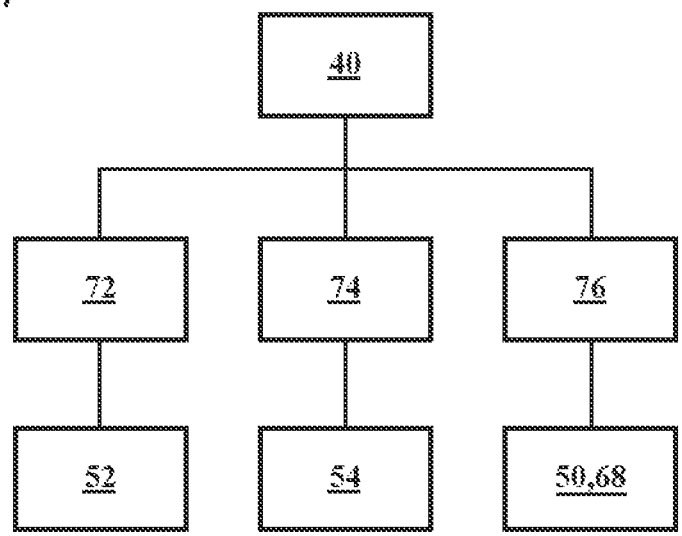
FIG. 7 is a schematic of a first junction in communication with a first inverter, a second inverter and a third inverter, with the first inverter in communication with the first motor/generator, and with the second inverter in communication with the second motor/generator, and with the third inverter in communication with a motor of the pump.
Figure 8:
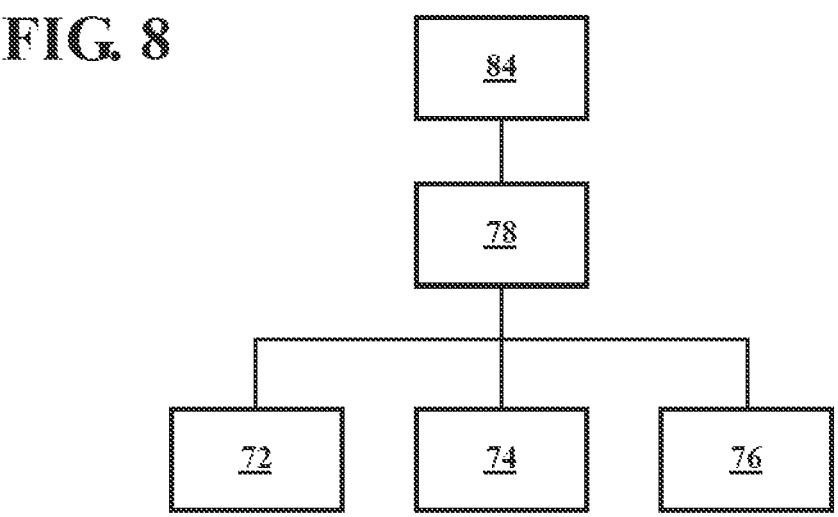
FIG. 8 is a schematic of a connection plug in communication with a controller, and with the controller in communication with the first, second and third inverters.

Turning to FIGS. 2 and 6, the power inverter module 30 includes a cooling system 32 for cooling the power inverter module 30. Therefore, the cooling system 32 is generally disposed in the power inverter module 30 to cool various components inside the power inverter module 30, some of which are discussed further below. A fluid is delivered, supplied or guided through the cooling system 32 inside the power inverter module 30 to cool the various components. The fluid flowing into and out of the power inverter module 30 can be a coolant. One example of a suitable coolant is ethylene glycol and deionized water. The fluid can be a fifty-fifty mixture of ethylene glycol and deionized water. In addition, the temperature of the fluid entering the power inverter module 30 through the cooling system 32 can be from about 75° C. or less. Furthermore, in one embodiment, the flow rate of the fluid flowing through the cooling system 32 can be from about 10 liters per minute (L/min). It is to be appreciated that the fluid through the cooling system 32 can be any suitable fluid, the temperature of the fluid through the cooling system 32 can be any suitable temperature and the flow rate of the fluid through the cooling system 32 can be any suitable flow rate.

Figure 5:
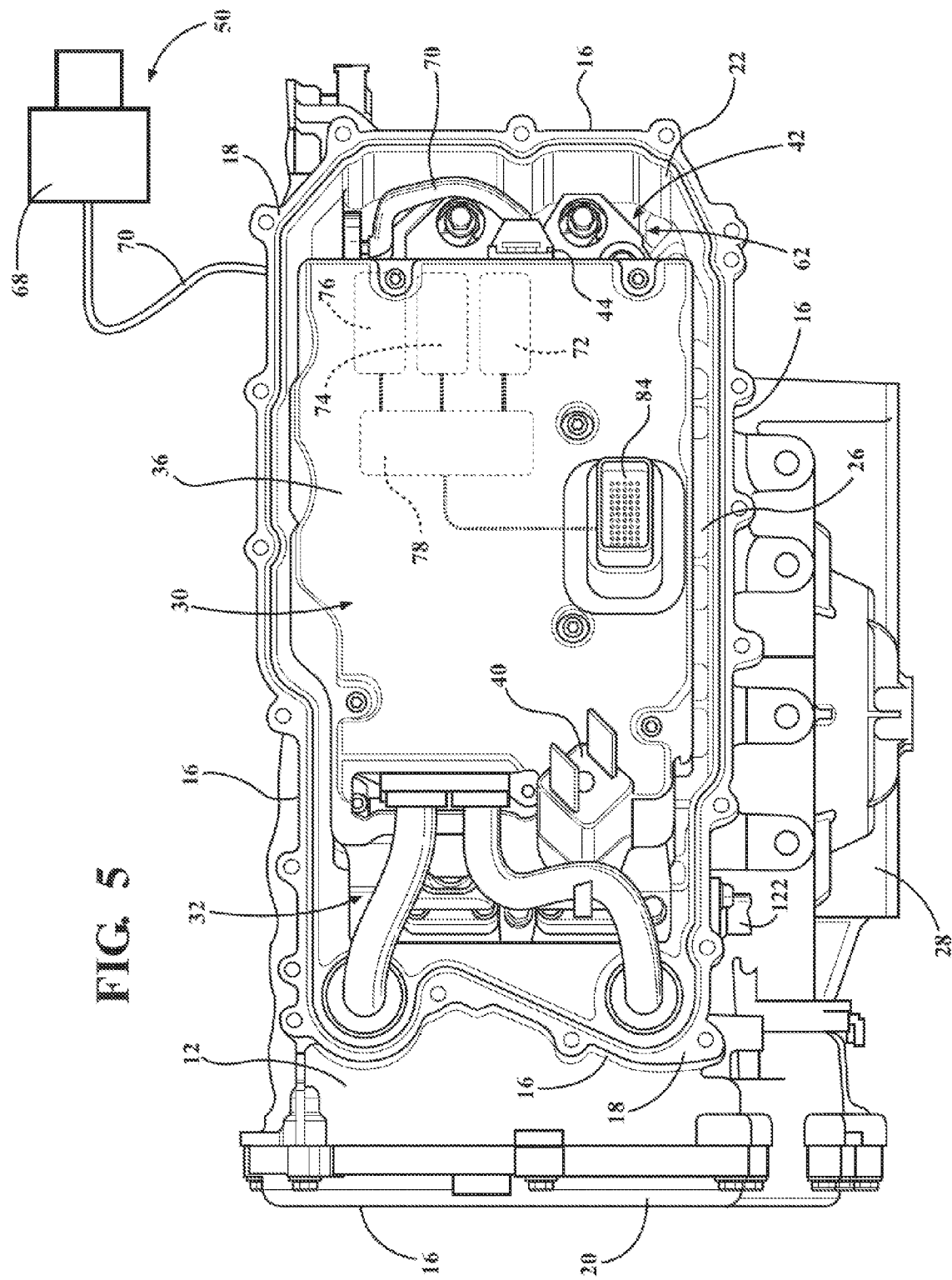
FIG. 5 is a schematic top perspective view of a power inverter module disposed in a first cavity with the lid removed.

Referring to FIGS. 2 and 5, the power inverter module 30 can define a self-contained unit selectively disposed in the first cavity 22. Generally, the self-contained unit is supported by the platform 26 when in the first cavity 22. The self-contained unit at least partially contains the cooling system 32. Packaging the power inverter module 30 as the self-contained unit provides a compact design, as well as provides easy assembly of the power inverter module 30 to the transmission 10 and easy disassembly of the power inverter module 30 from the transmission 10. Therefore, the power inverter module 30 is self-contained to be dropped into the first cavity 22 as a unit and integrated into the transmission 10, thus simplifying assembly. Furthermore, the power inverter module 30 is self-contained to allow easy replacement of the power inverter module 30 with another power inverter module 30. In addition, the power inverter module 30 is disposed in the first cavity 22 which defines the dry interior to separate the power inverter module 30 from the liquid fluid in the second cavity 24.

Referring to FIGS. 2 and 6, in certain embodiments, the power inverter module 30 can include a bottom 34 selectively coupled to the platform 26 and a cover 36 coupled to the bottom 34. The bottom 34 and the cover 36 cooperate to further define the self-contained unit. In other words, the bottom 34 and the cover 36 cooperate to define a hollow 37 therein, with various components of the power inverter module 30 disposed in the hollow 37, some of which are discussed further below. For example, at least a portion of the cooling system 32 is disposed in the hollow 37 of the power inverter module 30.

The bottom 34 of the power inverter module 30 can be coupled or attached to the platform 26 to secure the power inverter module 30 to the platform 26, and more specifically, to position the power inverter module 30 relative to the walls 16 in the first cavity 22. Therefore, uncoupling or detaching the bottom 34 of the power inverter module 30 from the platform 26 allows the self-contained unit to be easily removed and replaced by another power inverter module 30.

Continuing with FIGS. 1 and 2, the transmission 10 can also include a lid 38 attached to the casing 12 to contain the power inverter module 30 inside the first cavity 22. More specifically, the lid 38 can be attached to the distal edge 18 of each of the walls 16. The lid 38 is movable between a first position attached to the distal edge 18 of each of the walls 16 for containing the power inverter module 30 in the first cavity 22 of the casing 12 and a second position detached from the distal edge 18 of each of the walls 16 for removing the power inverter module 30 from the first cavity 22 of the casing 12 as the self-contained unit. Therefore, generally, the lid 38 is disposed in the first position when attached to the casing 12 and the lid 38 is disposed in the second position when detached from the casing 12. The lid 38 is shown in the first position in FIG. 1 and the lid 38 is shown in the second position in FIG. 2.

When the lid 38 is in the first position, the power inverter module 30 can be closed or sealed in the first cavity 22 such that the first cavity 22 remains dry to define the dry interior. It is to be appreciated that any suitable seal, gasket, etc. can be disposed between the distal edge 18 of each of the walls 16 and the lid 38 to assist in closing or sealing the first cavity 22 when the lid 38 is in the first position. Therefore, engagement between the lid 38 and the distal edge 18 of each of the walls 16 minimizes fluids, particles, etc. from entering the first cavity 22 from outside the casing 12.

Generally, the power inverter module 30 is configured for providing electrical energy to various components, some of which are discussed further below. Specifically, the power inverter module 30 is configured for converting direct current energy into alternating current energy. Therefore, the power inverter module 30 converts direct current energy into alternating current energy for various components, some of which are discussed further below.

Turning to FIGS. 2, 5 and 6, the power inverter module 30 can include a first junction 40 for receiving the direct current energy into the self-contained unit. Furthermore, the power inverter module 30 can include a second junction 42 and a third junction 44 each for outputting the alternating current energy from the self-contained unit. Generally, the first, second and third junctions 40, 42, 44 are spaced from each other.

Generally, a first cable harness 46 (see FIG. 1) is coupled to the first junction 40 for delivering or supplying the direct current energy into the power inverter module 30. Therefore, the direct current energy from the first cable harness 46 is delivered into the power inverter module 30 through the first junction 40 and converted into the alternating current energy which exits the power inverter module 30 through the second and third junctions 42, 44. In other words, the alternating current energy is outputted from the power inverter module 30 through the second and third junctions 42, 44.

In certain embodiments, the lid 38 defines a first opening 48 (see FIG. 2) cooperating with the first junction 40 such that the first cable harness 46 can engage the first junction 40. Specifically, the first cable harness 46 generally closes or seals the lid 38 about the first opening 48 to minimize fluids, particles, etc. from entering the first cavity 22 from outside of the lid 38. It is to be appreciated that other components can be utilized to close or seal the lid 38 about the first opening 48, such as, for example, seals, gaskets, caps, etc.

Turning to FIGS. 3 and 5, the transmission 10 can further include at least one of a pump 50 and a first motor/generator 52 electrically connected to one of the second and third junctions 42, 44 of the power inverter module 30 such that the alternating current energy is delivered or supplied to at least one of the pump 50 and the first motor/generator 52. In certain embodiments, the first motor/generator 52 is electrically connected to the second junction 42 of the power inverter module 30 and the pump 50 is electrically connected to the third junction 44 such that the alternating current energy is delivered to both the first motor/generator 52 and the pump 50.

Referring to FIG. 3, the first motor/generator 52 is disposed in the second cavity 24, and the transmission 10 can further include a second motor/generator 54 disposed in the second cavity 24. In other words, the first and second motor/generators 52, 54 are each disposed in the second cavity 24. In certain embodiments, the first and second motor/generators 52, 54 are each electrically connected to the second junction 42 of the power inverter module 30 such that the alternating current energy is delivered or supplied to the first and second motor/generators 52, 54. Therefore, the direct current energy from the first cable harness 46 is delivered into the power inverter module 30 through the first junction 40 and converted into the alternating current energy which exits the power inverter module 30 through the second junction 42 such that the alternating current energy is delivered to the first and second motor/generators 52, 54.

Generally, the first and second motor/generators 52, 54 can each include a rotor and a stator 56. In various embodiments, the first and/or second motor/generators 52, 54 can be referred to as traction motors. Continuing with FIG. 3, the first motor/generator 52 includes a first terminal 58 coupled to the second junction 42. The first terminal 58 is coupled to the stator 56 of the first motor/generator 52 to electrically connect the stator 56 of the first motor/generator 52 and the power inverter module 30 to each other. In addition, the second motor/generator 54 includes a second terminal 60 coupled to the second junction 42. The second terminal 60 is coupled to the stator 56 of the second motor/generator 54 to electrically connect the stator 56 of the second motor/generator 54 and the power inverter module 30 to each other. FIG. 3 illustrates the first and second terminals 58, 60 uncoupled from the second junction 42 for illustrative purposes only.

Generally, the electrically-variable transmission 10 can include the first and second motor/generators 52, 54 as discussed above. As implied above, the electrically-variable transmission 10 can be utilized in hybrid vehicles. Therefore, the power inverter module 30 is utilized to supply the alternating current energy to the first and second motor/generators 52, 54, as well as to control the first and second motor/generators 52, 54 as discussed further below. It is to be appreciated that the transmission 10 can include other components not specifically discussed herein. It is to also be appreciated that the transmission 10 can be utilized for vehicles other than hybrid vehicles as also discussed above.

Referring to FIGS. 2 and 5, specifically, an interface assembly 62 electrically connects the power inverter module 30 to the first and second motor/generators 52, 54. Therefore, the interface assembly 62 includes the second junction 42. The interface assembly 62 can further include a first bundle 64 and a second bundle 66 each disposed through the platform 26. Therefore, part of the first bundle 64 is disposed in the first cavity 22 to couple to the second junction 42 and another part of the first bundle 64 is disposed in the second cavity 24 to couple to the first terminal 58. Similarly, part of the second bundle 66 is disposed in the first cavity 22 to couple to the second junction 42 and another part of the second bundle 66 is disposed in the second cavity 24 to couple to the second terminal 60. FIG. 3 illustrates the first and second terminals 58, 60 uncoupled from the first and second bundles 64, 66 respectively for illustrative purposes only.

In various embodiments, the transmission 10 can include the pump 50 and the first and second motor/generators 52, 54. In one embodiment, the pump 50 can be disposed in the second cavity 24 of the transmission 10 (see FIG. 3). Turning to FIG. 5, the pump 50 can include a motor 68 electrically connected to the third junction 44 of the power inverter module 30 such that the alternating current energy is delivered or supplied to the motor 68 of the pump 50. More specifically, the direct current energy from the first cable harness 46 is delivered into the power inverter module 30 through the first junction 40 and converted into the alternating current energy which exits the power inverter module 30 through the third junction 44 such that the alternating current energy is delivered to the pump 50, and specifically, to the motor 68 of the pump 50. A second cable harness 70 (see FIG. 5) can be coupled to the third junction 44 and the motor 68 of the pump 50 to deliver the alternating current energy from the power inverter module 30 to the pump 50. It is to be appreciated that the first and second motor/generators 52, 54 are shown schematically in FIG. 3 for illustrative purposes and the configuration/location of the first and second motor/generators 52, 54 can change. Furthermore, it is to be appreciated that the pump 50 is shown schematically in FIGS. 3 and 5 for illustrative purposes only and the configuration/location of the pump 50 can change.

Turning to FIGS. 2 and 5-7, the power inverter module 30 can include a first inverter 72 electrically connected to the first motor/generator 52 for delivering or supplying alternating current energy to the first motor/generator 52 through the second junction 42. The power inverter module 30 can further include a second inverter 74 electrically connected to the second motor/generator 54 for delivering or supplying alternating current energy to the second motor/generator 54 through the second junction 42. Specifically, the alternating current energy is delivered to the first and second motor/generators 52, 54 through the interface assembly 62. Therefore, the direct current energy from the first cable harness 46 is converted into the alternating current energy in the first and second inverters 72, 74. As such, the first cable harness 46 is coupled to the first and second inverters 72, 74 through the first junction 40. Thus, the first and second inverters 72, 74 are electrically connected to the first junction 40. The cooling system 32 is utilized to cool the first and second inverters 72, 74 to assist in maintaining performance of the first and second inverters 72, 74. In other words, a portion of the cooling system 32 is disposed around the first and second inverters 72, 74 inside the power inverter module 30 to cool the first and second inverters 72, 74 to minimize overheating of the first and second inverters 72, 74. It is to be appreciated that the first and second inverters 72, 74 are shown schematically in the power inverter module 30 of FIGS. 2, 5 and 6 for illustrative purposes only and the configuration/location of the first and second inverters 72, 74 can change. It is to also be appreciated that some of the electrical connections are shown in FIGS. 2 and 6.

Continuing with FIGS. 2 and 5-7, in addition, the power inverter module 30 can include a third inverter 76 electrically connected to the motor 68 of the pump 50 for delivering or supplying alternating current energy to the motor 68 of the pump 50 through the third junction 44. Specifically, the alternating current energy is delivered to the motor 68 of the pump 50 through the third junction 44 and the second cable harness 70. Therefore, the direct current energy from the first cable harness 46 is converted into the alternating current energy in the third inverter 76. As such, the first cable harness 46 is coupled to the third inverter 76 through the first junction 40. Thus, the third inverter 76 is electrically connected to the first junction 40. The cooling system 32 is utilized to cool the third inverter 76 to assist in maintaining performance of the third inverter 76. In other words, a portion of the cooling system 32 is disposed around the third inverter 76 inside the power inverter module 30 to cool the third inverter 76 to minimize overheating of the third inverter 76. It is to be appreciated that the third inverter 76 is shown schematically in the power inverter module 30 of FIGS. 2, 5 and 6 for illustrative purposes only and the configuration/location of the third inverter 76 can change. As discussed above, it is to also be appreciated that some of the electrical connections are shown in FIGS. 2 and 6.

Turning to FIGS. 2, 5, 7 and 8, furthermore, the power inverter module 30 can include a controller 78 coupled to at least one of the first, second and third inverters 72, 74, 76 for controlling at least one of the motor 68 of the pump 50 and the first and second motor/generators 52, 54. In certain embodiments, the controller 78 is coupled to the first, second and third inverters 72, 74, 76 for controlling the first and second motor/generators 52, 54 and the motor 68 of the pump 50. In other words, the controller 78 is in communication with the first, second and third inverters 72, 74, 76. It is to be appreciated that the controller 78 is shown schematically in the power inverter module 30 of FIGS. 2, 5 and 6 for illustrative purposes only and the configuration/location of the controller 78 can change. It is to further be appreciated that more than one controller 78 can be disposed in the power inverter module 30. It is to also be appreciated that some of the connections are shown in FIGS. 5 and 6.

The controller 78 and the first, second and third inverters 72, 74, 76 are each disposed in the self-contained unit of the power inverter module 30. Furthermore, the cooling system 32 is generally disposed in the self-contained unit of the power inverter module 30. In other words, the controller 78, and the first, second and third inverters 72, 74, 76 are each disposed in the hollow 37 of the power inverter module 30, as well as a portion of the cooling system 32. As such, packaging of the controller 78 and the first, second and third power inverters 72, 74, 76, as well as the cooling system 32, in the self-contained unit of the power inverter module 30 provides a compact design, as well as provides easy assembly of the power inverter module 30 to the transmission 10 and easy disassembly of the power inverter module 30 from the transmission 10. Therefore, the power inverter module 30 is self-contained to be integrated into the transmission 10, thus simplifying assembly. As such, the configuration of the casing 12 can be consistent or the same, and thus provide a universal casing 12 that can be used in multiple different vehicles.

Referring to FIG. 2, the lid 38 can also define a second opening 80 spaced from the first opening 48 such that a wire harness 82 (see FIG. 1) is electrically connected to at least one of the controller 78 and the first, second and third inverters 72, 74, 76. More specifically, the wire harness 82 connects the controller 78 to other vehicle systems such that the controller 78 can communicate with other vehicle systems.

A connection plug 84 (see FIGS. 1 and 2) can extend from the power inverter module 30 and cooperates with the second opening 80 and the wire harness 82 such that the wire harness 82 can engage the connection plug 84. Furthermore, the connection plug 84 and the controller 78 are in communication with each other (see FIGS. 2 and 8). Therefore, the wire harness 82 is coupled to the controller 78 through the connection plug 84 such that the wire harness 82 and the controller 78 are in communication with each other. Specifically, the wire harness 82 generally closes or seals the lid 38 about the second opening 80 to minimize fluids, particles, etc. from entering the first cavity 22 from outside of the lid 38. It is to be appreciated that other components can be utilized to close or seal the lid 38 about the second opening 80, such as, for example, seals, gaskets, caps, etc. It is to also be appreciated that the first and second cable harnesses 46, 70 and the wire harness 82 are shown schematically for illustrative purposes.

Turning to FIG. 4, the transmission 10 also includes a guide 86 attached to the platform 26 and the casing 12 within the second cavity 24 such that the guide 86 provides fluid communication between the cooling system 32 of the power inverter module 30 within the first cavity 22 and outside of the casing 12 while bypassing the second cavity 24. Simply stated, fluid can be delivered, supplied or guided through the guide 86 disposed inside the second cavity 24 into and out of the power inverter module 30 within the first cavity 22 without allowing the fluid to flow freely into the second cavity 24. The guide 86 is sealed from the second cavity 24 such that the fluid cannot flow into the second cavity 24 and is instead delivered through the guide 86 into and out of the cooling system 32 in the first cavity 22 and outside of the casing 12. In certain embodiments, the guide 86 can be spaced from the first and second motor/generators 52, 54 in the second cavity 24, and additionally, spaced from the pump 50 in the second cavity 24. The guide 86 is disposed in the second cavity 24 to reduce space requirements outside of the casing 12 and provide uniformity to the location where fluid flows into and out of the casing 12 as discussed further below. Therefore, the guide 86 provides a compact and universal casing 12 and thus a universal transmission 10 that can be utilized in multiple different vehicles. Furthermore, the guide 86 is integrated into the casing 12 to reduce the number of assembly components and thus simplify assembly of the transmission 10.

In certain embodiments, the guide 86 is integrally formed with the platform 26 and the casing 12 inside the second cavity 24. More specifically, in various embodiments, the guide 86 is integrally formed with the platform 26 and one of the walls 16 inside the second cavity 24. In other words, the guide 86 is integrally formed with the platform 26 and one of the walls 16 inside the casing 12. Simply stated, the guide 86, the platform 26 and the casing 12 are formed of one piece. The guide 86 can be integrally formed with the platform 26 and the casing 12 by casting or any other suitable methods. In certain embodiments, the guide 86 can be attached to the platform 26 and the casing 12 by welding or any other suitable methods, instead of being integrally formed.

Referring to FIGS. 2 and 6, the cooling system 32 can include a body portion 88 extending from the power inverter module 30. The body portion 88 defines an inlet 90 and an outlet 92 in fluid communication with the guide 86 for guiding fluid into and out of the cooling system 32 of the power inverter module 30. Therefore, the body portion 88 is coupled to at least one of the cover 36 and the bottom 34 of the power inverter module 30 such that the inlet 90 and the outlet 92 are exposed outside of the power inverter module 30. In one embodiment, the body portion 88 is coupled to the bottom 34 of the power inverter module 30 and the inlet 90 and the outlet 92 faces the platform 26. The guide 86 is attached to the platform 26 and the casing 12 within the second cavity 24 such that the guide 86 provides fluid communication between the inlet 90 and the outlet 92 of the cooling system 32 of the power inverter module 30 within the first cavity 22 and outside of the casing 12 while bypassing the second cavity 24. Simply stated, fluid can be delivered, supplied or guided through the guide 86 disposed inside the second cavity 24 into and out of the cooling system 32 within the first cavity 22 without allowing the fluid to flow freely into the second cavity 24.

Turning to FIG. 6, the cooling system 32 can include a conduit 94 disposed in the power inverter module 30 and coupled to the inlet 90 and the outlet 92 for guiding the fluid through the power inverter module 30. Simply stated, the conduit 94 is disposed in the hollow 37 of the power inverter module 30. Therefore, the conduit 94 of the cooling system 32 is positioned inside the power inverter module 30 to guide 86 the fluid around the first, second and third inverters 72, 74, 76 to cool the first, second and third inverters 72, 74, 76 to assist in maintaining performance of the first, second and third inverters 72, 74, 76. In other words, the portion of the cooling system 32 as discussed above can be further defined as the conduit 94 which is disposed around the first, second and third inverters 72, 74, 76 inside the power inverter module 30 to cool the first, second and third inverters 72, 74, 76 to minimize overheating of the first, second and third inverters 72, 74, 76. It is to be appreciated more than one conduit 94 can be disposed in the power inverter module 30 for guiding the fluid through the power inverter module 30.

Turning to FIG. 4, the guide 86 can include a first segment 96 disposed in the second cavity 24. The first segment 96 defines a first passageway 98 extending from the platform 26 to the casing 12 for guiding the fluid from outside of the casing 12 to the inlet 90 of the cooling system 32 in the first cavity 22 and bypassing fluid communication with the second cavity 24. Simply stated, the first passageway 98 is in fluid communication with the inlet 90.

Furthermore, the guide 86 can include a second segment 100 disposed in the second cavity 24. The second segment 100 defines a second passageway 102 spaced from the first passageway 98 and extending from the platform 26 to the casing 12 for guiding the fluid from the outlet 92 of the cooling system 32 in the first cavity 22 to outside of the casing 12 and bypassing fluid communication with the second cavity 24. Simply stated, the second passageway 102 is in fluid communication with the outlet 92.

In certain embodiments, the first and second segments 96, 100 are integrally formed with the platform 26 and the casing 12. More specifically, in various embodiments, the first and second segments 96, 100 are integrally formed with the platform 26 and one of the walls 16 inside the second cavity 24. In other words, the first and second segments 96, 100 are integrally formed with the platform 26 and one of the walls 16 inside the casing 12. Simply stated, the first and second segments 96, 100, the platform 26 and the casing 12 are formed of one piece. The first and second segments 96, 100 can be integrally formed with the platform 26 and the casing 12 by casting or any other suitable methods. The first and second segments 96, 100 can be attached to the platform 26 and the casing 12 by welding or any other suitable methods, instead of being integrally formed. Furthermore, the first and second segments 96, 100 can be integrally formed to each other. For example, in certain embodiments, the guide 86 can be a block defining both the first and second passageways 98, 102 with or without one or more voids 103 disposed between the first and second segments 96, 100 (see FIG. 4 where one void 103 is illustrated between the first and second segments 96, 100). It is to be appreciated that the guide 86 can include a first tube and a second tube defining the first and second passageways 98, 102 respectively. Simply stated, the guide 86 can be two separate tubes, i.e., spaced from each other, with the tubes attached to the platform 26 and the casing 12.

Continuing with FIG. 4, in various embodiments, the first and second passageways 98, 102 can each include a first portion 104 extending vertically from the platform 26. Furthermore, in various embodiments, the first and second passageways 98, 102 can each include a second portion 106 extending horizontally from the casing 12. Therefore, the first and second portions 104, 106 of the first passageway 98 can intersect at a first elbow 108. Additionally, the first and second portions 104, 106 of the second passageway 102 can intersect at a second elbow 110. Simply stated, the first portion 104 of the first and second passageways 98, 102 extend vertically into the second cavity 24 away from the platform 26 and the second portion 106 of the first and second passageways 98, 102 extend horizontally into the second cavity 24 away from one of the walls 16 of the casing 12. The guide 86 and thus the segments 96, 100 can be any suitable configuration and location in the second cavity 24; and therefore, the first and second passageways 98, 102 can be any suitable configuration and location. For example, the first portion 104 of the first and second passageways 98, 102 can each extend angularly generally vertical, and the second portion 106 of the first and second passageways 98, 102 can each extend angularly generally horizontal.

Referring to FIG. 6, the body portion 88 can include a coupling portion 112 adjacent to at least one of the inlet 90 and the outlet 92 for securing the power inverter module 30 to the platform 26 such that the inlet 90 aligns with the first passageway 98 of the first segment 96 and the outlet 92 aligns with the second passageway 102 of the second segment 100. The coupling portion 112 can be any suitable configuration and location. It is to be appreciated that any suitable seal, gasket, etc. can be disposed between the platform 26 and the coupling portion 112 adjacent to the inlet 90 and the outlet 92 to assist in sealing the inlet 90 and the outlet 92 with the guide 86 to minimize fluid leaking into the first cavity 22.

Turning to FIG. 4, the platform 26 can define a first bore 114 and a second bore 116 spaced from each other. The inlet 90 and the first passageway 98 are in fluid communication with the first bore 114 to provide fluid communication between the cooling system 32 and the first segment 96. Therefore, the fluid flows through the first passageway 98 of the first segment 96, through the first bore 114 of the platform 26, into the inlet 90 of the cooling system 32 and through the conduit 94 inside the power inverter module 30. In addition, the outlet 92 and the second passageway 102 are in fluid communication with the second bore 116 to provide fluid communication between the cooling system 32 and the second segment 100. Therefore, the fluid flows out of the outlet 92 of the cooling system 32, through the second bore 116 of the platform 26 and into the second passageway 102 of the second segment 100.

Referring to FIGS. 1, 2 and 4, the casing 12 can define a first hole 118 and a second hole 120 spaced from each other. In certain embodiments, the first and second holes 118, 120 are defined in one of the walls 16 of the casing 12. In other words, one of the walls 16 defines the first and second holes 118, 120 spaced from each other. Simply stated, the same wall 16 defines both the first and second holes 118, 120. Generally, the inlet 90 and the first passageway 98 are in fluid communication with the first hole 118 to provide fluid communication between the cooling system 32 in the first cavity 22 and outside of the casing 12. More specifically, the inlet 90, the first bore 114 and the first passageway 98 are in fluid communication with the first hole 118 to provide fluid communication between the cooling system 32 in the first cavity 22 and outside of the casing 12. Additionally, generally, the outlet 92 and the second passageway 102 are in fluid communication with the second hole 120 to provide fluid communication between the cooling system 32 in the first cavity 22 and outside of the casing 12. More specifically, the outlet 92, the second bore 116 and the second passageway 102 are in fluid communication with the second hole 120 to provide fluid communication between the cooling system 32 in the first cavity 22 and outside of the casing 12.

The transmission 10 can also include a first port 122 attached to the exterior 28 of the casing 12 about the first hole 118 such that the first port 122, the first hole 118 and the first passageway 98 are in fluid communication with each other for guiding the fluid from the first port 122 outside of the casing 12 through the first hole 118 to inside the casing 12. Generally, the fluid flows into the casing 12 through the first port 122. Specifically, the fluid flows through the first port 122, through the first hole 118 of the casing 12, through the first passageway 98 of the guide 86, through the first bore 114 of the platform 26, through the inlet 90 of the cooling system 32 and into the conduit 94 of the cooling system 32 inside the power inverter module 30 to cool various components of the power inverter module 30, which can include the first, second and third inverters 72, 74, 76 as discussed above.

In addition, the transmission 10 can include a second port 124 spaced from the first port 122 and attached to the exterior 28 of the casing 12 about the second hole 120 such that the second port 124, the second hole 120 and the second passageway 102 are in fluid communication with each other for guiding the fluid from inside the casing 12 through the second hole 120 to the second port 124 outside of the casing 12. Generally, the fluid flows out of the casing 12 through the second port 124. Specifically, the fluid flows from the conduit 94 of the cooling system 32 out the outlet 92 of the cooling system 32, through the second bore 116 of the platform 26, through the second passageway 102 of the guide 86, through the first hole 118 of the casing 12 and through the second port 124 to outside of the casing 12. Simply stated, cool fluid flows into the power inverter module 30 from outside the casing 12 and warm fluid flows out of the power inverter module 30 to outside of the casing 12 to be cooled again. It is to be appreciated that one or more fluid lines can be coupled to the first and second ports 122, 124 outside of the casing 12 to guide 86 the fluid to or from a reservoir containing the fluid. It is to also be appreciated that any suitable seal, gasket, etc. can be disposed between the wall 16 of the casing 12 and the first and second ports 122, 124 adjacent to the first and second holes 118, 120 to assist in sealing the first and second holes 118, 120 with the first and second ports 122, 124 to minimize fluid leaking outside of the casing 12.

In certain embodiments, the first and second ports 122, 124 are attached to one of the walls 16 of the casing 12. As discussed above, the first and second holes 118, 120 can be defined in the same wall 16. Therefore, the first port 122 is attached to the exterior 28 of the casing 12 about the first hole 118 and the second port 124 is attached to the exterior 28 of the casing 12 about the second hole 120. Simply stated, both of the first and second ports 122, 124 are attached to the same wall 16. The first and second ports 122, 124 are disposed on the same wall 16 of the casing 12 to provide uniformity of the casing 12. Therefore, providing a standard location for the first and second ports 122, 124, this transmission 10 can be adapted for multiple different vehicles. In other words, the transmission 10 is universal for multiple different vehicles. Furthermore, a standard location for the first and second ports 122, 124 allows one standard test machine to be utilized to inspect the power inverter module 30 during assembly of the transmission 10 for multiple different vehicles, instead of having different test machines configured for each different vehicle.

It is to be appreciated that various components have been removed from FIG. 2 for illustrative purposes only, for example, fasteners for attaching or securing the lid 38 to the casing 12 have been removed, as well as the first cable harness 46 and the wire harness 82 have been removed. It is to also be appreciated that not all of the components have been exploded in FIG. 2 for illustrative purposes only, for example, the first and second bundles 64, 66 are not exploded.

While the best modes for carrying out the disclosure have been described in detail, those familiar with the art to which this disclosure relates will recognize various alternative designs and embodiments for practicing the disclosure within the scope of the appended claims.

The invention claimed is:

1. A transmission for a vehicle, the transmission comprising:
   a casing defining a first cavity and a second cavity inside the casing;
   a platform at least partially disposed inside the casing to separate the first and second cavities;
   a power inverter module completely surrounded by the first cavity, and including a cooling system for cooling the power inverter module, with the cooling system defining an inlet and an outlet; and
   a guide body attached to the platform and the casing, with the guide body extending outwardly away from the platform toward the second cavity, and wherein the guide body provides fluid communication between the cooling system of the power inverter module within the first cavity and outside of the casing while bypassing the second cavity;
   wherein the guide body defines a first passageway extending through the platform and an outer wall of the casing for guiding a fluid from outside of the casing to the inlet of the cooling system in the first cavity and bypassing fluid communication with the second cavity;
   wherein the guide body defines a second passageway spaced from the first passageway and extending through the platform and the outer wall of the casing for guiding the fluid from the outlet of the cooling system in the first cavity to outside of the casing and bypassing fluid communication with the second cavity;
   wherein the first and second passageways each include a first portion extending vertically from the platform, and wherein the first and second passageways each include a second portion extending horizontally from the casing, with the first and second portions of the first passageway intersecting at a first elbow, and with the first and second portions of the second passageway intersecting at a second elbow.

2. A transmission as set forth in claim 1 wherein the cooling system includes a body portion extending from the power inverter module and defining the inlet and the outlet in fluid communication with the first and second passageways, respectively, for guiding the fluid into and out of the cooling system of the power inverter module.

3. A transmission as set forth in claim 2 wherein the body portion includes a coupling portion disposed within the first cavity and adjacent to at least one of the inlet and the outlet for securing the power inverter module to the platform such that the inlet aligns with the first passageway and the outlet aligns with the second passageway.

4. A transmission as set forth in claim 2 wherein the cooling system includes a conduit disposed inside the power inverter module and coupled to the inlet and the outlet for guiding the fluid through the power inverter module.

5. A transmission as set forth in claim 1 wherein the platform defines a first bore and a second bore spaced from each other, with the inlet and the first passageway in fluid communication with the first bore to provide fluid communication therebetween, and with the outlet and the second passageway in fluid communication with the second bore to provide fluid communication therebetween.

6. A transmission as set forth in claim 5 wherein the outer wall of the casing defines a first hole and a second hole spaced from each other, with the inlet, the first bore and the first passageway in fluid communication with the first hole to provide fluid communication between the cooling system in the first cavity and outside of the casing, and with the outlet, the second bore and the second passageway in fluid communication with the second hole to provide fluid communication between the cooling system in the first cavity and outside of the casing.

7. A transmission as set forth in claim 1 wherein the outer wall of the casing defines a first hole and a second hole spaced from each other, with the inlet and the first passageway in fluid communication with the first hole to provide fluid communication between the cooling system in the first cavity and outside of the casing, and with the outlet and the second passageway in fluid communication with the second hole to provide fluid communication between the cooling system in the first cavity and outside of the casing.

8. A transmission as set forth in claim 7 further including a first port attached to an exterior of the casing about the first hole such that the first port, the first hole and the first passageway are in fluid communication with each other for guiding the fluid from the first port outside of the casing through the first hole to inside the casing.

9. A transmission as set forth in claim 8 further including a second port spaced from the first port and attached to the exterior of the casing about the second hole such that the second port, the second hole and the second passageway are in fluid communication with each other for guiding the fluid from inside the casing through the second hole to the second port outside of the casing.

10. A transmission as set forth in claim 1 wherein the guide body is integrally formed with the platform and the outer wall of the casing.

11. A transmission as set forth in claim 1 wherein the casing includes a base and a plurality of walls extending outwardly away from the base to a distal edge, with the platform and the first and second cavities disposed between the walls, and wherein one of the walls is further defined as the outer wall, and the outer wall defines a first hole and a second hole spaced from each other, with a first port attached to an exterior of the casing about the first hole and a second port attached to the exterior of the casing about the second hole.

12. A transmission as set forth in claim 1 wherein the power inverter module defines a self-contained unit selectively disposed in the first cavity, with the self-contained unit supported by the platform when in the first cavity.

13. A transmission as set forth in claim 1 wherein the power inverter module includes a first inverter electrically connected to a first motor/generator and a second inverter electrically connected to a second motor/generator, and wherein the power inverter module includes a cover and a bottom that cooperate to define a hollow, with the first and second inverters disposed inside the hollow, and wherein the cooling system includes a conduit disposed inside the hollow and around the first and second inverters.

14. A transmission as set forth in claim 1 further including a lid attached to the casing to contain the power inverter module inside the first cavity, and wherein the cooling system includes a body portion extending from the power inverter module and defining the inlet and the outlet in fluid communication with the first and second passageways, respectively, and wherein the body portion includes a coupling portion disposed within the first cavity.

15. A transmission as set forth in claim 1 wherein the platform defines a first bore and a second bore spaced from each other, and wherein the first portion of the first passageway aligns concentrically with the first bore of the platform and the first portion of the second passageway aligns concentrically with the second bore of the platform.

16. A transmission for a vehicle, the transmission comprising:
- a casing defining a first cavity and a second cavity inside the casing;
- a platform at least partially disposed inside the casing to separate the first and second cavities;
- a power inverter module including a bottom coupled to the platform and a cover coupled to the bottom, with the bottom and the cover cooperating to define a self-contained unit and a hollow therebetween, and with the power inverter module disposed in the first cavity;
- wherein the power inverter module includes a first inverter electrically connected to a first motor/generator and a second inverter electrically connected to a second motor/generator, with the first and second inverters disposed in the hollow between the cover and the bottom;
- wherein the power inverter module includes a cooling system at least partially disposed inside the cover and the bottom for cooling the power inverter module, with the cooling system including a body portion defining an inlet and an outlet, and with the body portion coupled to the bottom of the power inverter module, and the cooling system includes a conduit disposed inside the hollow and around the first and second inverters; and
- a guide body attached to the platform and the casing, with the guide body extending outwardly away from the platform toward the second cavity, and wherein the guide body provides fluid communication between the inlet and the outlet of the cooling system of the power inverter module within the first cavity and outside of the casing while bypassing the second cavity;
- wherein the guide body defines a first passageway extending through the platform and the casing for guiding a fluid from outside of the casing to the inlet of the cooling system in the first cavity and bypassing fluid communication with the second cavity;
- wherein the guide body defines a second passageway spaced from the first passageway and extending through the platform and the casing for guiding the fluid from the outlet of the cooling system in the first cavity to outside of the casing and bypassing fluid communication with the second cavity;
- wherein the first and second passageways each include a first portion extending vertically from the platform, and wherein the first and second passageways each include a second portion extending horizontally from the casing, with the first and second portions of the first passageway intersecting at a first elbow, and with the first and second portions of the second passageway intersecting at a second elbow.

17. A transmission as set forth in claim 12 wherein the power inverter module includes a bottom selectively coupled to the platform and a cover coupled to the bottom, with the bottom and the cover cooperate to further define the self-contained unit, and wherein the cooling system is at least partially disposed inside the cover and the bottom.

18. A transmission as set forth in claim 16 wherein the platform defines a first bore and a second bore spaced from each other, with the inlet and the first passageway in fluid communication with the first bore to provide fluid communication therebetween, and with the outlet and the second passageway in fluid communication with the second bore to provide fluid communication therebetween.

19. A transmission as set forth in claim 16 wherein the platform defines a first bore and a second bore spaced from each other, and wherein the first portion of the first passageway aligns concentrically with the first bore of the platform and the first portion of the second passageway aligns concentrically with the second bore of the platform.

20. A transmission comprising:
- a casing defining a first cavity and a second cavity inside the casing, with the first cavity selectively open to outside of the casing, with the casing defining a first hole and a second hole spaced from each other;
- a platform at least partially disposed inside the casing to separate the first and second cavities, with the platform defining a first bore and a second bore spaced from each other;
- a power inverter module selectively disposed in the first cavity, and including a cooling system for cooling the power inverter module, with the cooling system defining an inlet and an outlet;
- a guide body attached to the platform and the casing, with the guide body extending outwardly away from the platform toward the second cavity, and wherein the guide body provides fluid communication between the cooling system of the power inverter module within the first cavity and outside of the casing while bypassing the second cavity;
- wherein the guide body defines a first passageway extending through the platform and an outer wall of the casing for guiding a fluid from outside of the casing to the inlet of the cooling system in the first cavity and bypassing fluid communication with the second cavity;
- wherein the guide body defines a second passageway spaced from the first passageway and extending through the platform and the outer wall of the casing for guiding the fluid from the outlet of the cooling system in the first cavity to outside of the casing and bypassing fluid communication with the second cavity;
- wherein the first and second passageways each include a first portion extending vertically from the platform, and wherein the first and second passageways each include a second portion extending horizontally from the casing, with the first and second portions of the first passageway intersecting at a first elbow, and with the first and second portions of the second passageway intersecting at a second elbow;
- wherein the first portion of the first passageway aligns concentrically with the first bore of the platform and the first portion of the second passageway aligns concentrically with the second bore of the platform; and
- wherein the second portion of the first passageway aligns concentrically with the first hole of the casing and the second portion of the second passageway aligns concentrically with the second hole of the casing.

* * * * *